(12) United States Patent
Linden et al.

(10) Patent No.: US 11,408,752 B2
(45) Date of Patent: Aug. 9, 2022

(54) MULTI-TURN ANGLE MEASUREMENT DEVICE

(71) Applicant: Hengstler GmbH, Aldingen (DE)

(72) Inventors: Martin Linden, Donaueschingen (DE); Kai Klaeger, Rottweil (DE); Thorsten Blust, Deisslingen (DE)

(73) Assignee: HENGSTLER GMBH, Aldingen (DE)

( * ) Notice: Subject to any disclaimer, the term of this patent is extended or adjusted under 35 U.S.C. 154(b) by 444 days.

(21) Appl. No.: 16/613,887

(22) PCT Filed: May 15, 2018

(86) PCT No.: PCT/EP2018/062489
§ 371 (c)(1),
(2) Date: Nov. 15, 2019

(87) PCT Pub. No.: WO2018/210797
PCT Pub. Date: Nov. 22, 2018

(65) Prior Publication Data
US 2020/0166375 A1   May 28, 2020

(30) Foreign Application Priority Data
May 16, 2017   (DE) ..................... 10 2017 004 672.7

(51) Int. Cl.
*G01D 5/14* (2006.01)
*F16H 55/06* (2006.01)
*G01B 11/26* (2006.01)

(52) U.S. Cl.
CPC ............. *G01D 5/145* (2013.01); *F16H 55/06* (2013.01); *G01B 11/26* (2013.01); *F16H 2055/065* (2013.01)

(58) Field of Classification Search
CPC ... G01D 5/145; F16H 55/06; F16H 2055/065; G01B 11/26
See application file for complete search history.

(56) References Cited

U.S. PATENT DOCUMENTS 7,017,274 B2   3/2006   Stobbe
7,194,921 B1 *  3/2007   Fergus ............... B60G 17/0195
                                                73/514.39
(Continued)

FOREIGN PATENT DOCUMENTS

DE   102006044855 A1   4/2008
DE   102009039574 A1   3/2010
(Continued)

*Primary Examiner* — Clayton E. LaBalle
*Assistant Examiner* — Michael A Harrison
(74) *Attorney, Agent, or Firm* — Browdy and Neimark, PLLC (57) ABSTRACT

The invention relates to a multi-turn angle measurement device for measuring multiple revolutions of a shaft (4), consisting of a first code carrier (31) with an optical single-turn scanning function (34) for detecting the absolute position of the shaft and a second code carrier for measuring the number of revolutions of the shaft (4). A reduction gear (2) is arranged between the first code carrier (31) and the second code carrier, and the second code carrier consists of a number of permanent magnets (22), the position of which is detected by an assembly of Hall sensors (16a-16b) fixed to the housing. Each of the permanent magnets (22) is embedded into the plastic material of the transmission gears (20) of the reduction gear (2).

9 Claims, 9 Drawing Sheets (56) References Cited

U.S. PATENT DOCUMENTS

| | | |
|---|---|---|
| 7,798,121 B2 | 9/2010 | Hellinger et al. |
| 8,058,866 B2 | 11/2011 | Granig et al. |
| 8,825,439 B2 | 9/2014 | Mayer et al. |
| 2004/0256545 A1* | 12/2004 | Stobbe ................ G01D 5/145 |
| | | 250/231.13 |
| 2008/0051961 A1 | 2/2008 | Ebashi et al. |
| 2009/0283069 A1* | 11/2009 | Hellinger ............... F02D 9/105 |
| | | 324/207.25 |
| 2013/0015333 A1 | 1/2013 | Miyajima et al. |
| 2018/0009476 A1 | 1/2018 | Takayanagi |

FOREIGN PATENT DOCUMENTS

| | | |
|---|---|---|
| DE | 102008051083 A1 | 4/2010 |
| DE | 102008053526 A1 | 4/2010 |
| DE | 202008018076 U1 | 8/2011 |
| DE | 102012200239 A1 | 7/2013 |
| DE | 102015005111 A1 | 10/2016 |
| DE | 112016000797 T5 | 10/2017 |
| EP | 1391696 A2 | 2/2004 |

* cited by examiner

MULTI-TURN ANGLE MEASUREMENT DEVICE

The invention relates to a multi-turn angle measurement device for measuring multiple revolutions of a shaft. The invention is based on a multi-turn angle measurement that comprises a single turn detection using optics and a multi-turn detection that uses magnetic scanning.

The invention is based on EP 1 391 696 A2, which describes a multi-turn angle measurement device with an optical single-turn scanning function and a magnetic multi-turn scanning function.

The disadvantage of the known multi-turn angle measurement device is that it uses transmission gears that are complex and have some play, which uses a worm wheel, which interacts with the other transmission gears with significant play, resulting in only an inadequate multi-turn angle scanning with correspondingly fast wear of the gears.

Another disadvantage is the fastening of the permanent magnets in the transmission design, which leads to a non-compact design, because the permanent magnets are arranged with mounts of their own above the transmission gears and not integrated in them.

Furthermore, the installation costs are high because the magnets must be adhered to the code carrier, which is arranged outside the transmission design, which increases the total height and is associated with the risk that it can be lost, i.e. when the adhesive fails after an extended service life.

Furthermore, the adhesion process is associated with a certain amount of play, which cannot be minimized due to the machine processing.

The known multi-turn angle measurement device is furthermore characterized by the fact that the optic single-turn scanning function is arranged on the one side of a conductor plate while the magnetically working multi-turn angle scanning function is arranged on the opposite side. This results in a compact design, which cannot, however, be minimized any further.

The invention is therefore, based on this printed prior art document, based on the task to further develop a multi-turn angle measurement device of the type described above that has a much more compact design and thus allows for a cost-effective production with an arrangement of the permanent magnets that has as little play as possible.

To solve the assigned task, the invention is characterized by the technical teaching of claim 1.

The feature of the invention is that the permanent magnets are directly integrated into the transmission design, so they are directly embedded into the respective assigned transmission gear with an overmold, and the respective transmission gear itself, which holds the respective permanent magnet, is secured on the assigned axle with a snapping mechanism.

Compared to prior art, this technical teaching has the advantage that it is now easily possible to fasten the respective permanent magnets on the transmission gear without any play because the invention provides that the respective permanent magnet is embedded in the plastic material of the transmission gear with an overmold.

This results in a particularly simple and compact design because the permanent magnet is directly inserted into the injection mold during the production of the transmission gear and embedded into the plastic during the production of the transmission gear when the plastic is injected into the mold.

Consequently, the complex and fragile adhesive bonds described in prior art are no longer necessary, and the custom-fit orientation of the permanent magnet on the transmission gear is always the same and does not have the play that must be tolerated when using adhesive bonds.

According to a further feature of the invention, the magnetization of the permanent magnets takes place directly in the injection mold, i.e. after the molding of the permanent magnet in the plastic material of the transmission gear, which has the advantage that the magnetic force that is generated is always the same and does not deviate from other molded permanent magnets in other transmission gears.

According to a further feature of the invention, a snapping connection is created between the transmission gear holding the embedded permanent magnet and the axle on which the transmission gear is rotatably positioned.

To keep the description simple, the description below will only be using the term "magnetic transmission gear," which means that at least one permanent magnet is embedded by overmolding in the transmission gear which is made from plastic and not magnetically conductive.

In a preferred embodiment, the permanent magnet remains exposed only on a front side, i.e. the lower front side, where a specific distance to a Hall element arranged below it, which must be exactly adhered to, is to be provided.

The front side of the permanent magnet embedded in the plastic material of the transmission gear is therefore substantially exposed and only has the retaining lugs which extend only partially from the front side of the permanent magnet that is exposed there.

Consequently, a completely exposed front side of the permanent magnet is formed at a precisely defined distance from a Hall element.

To ensure that this distance does not change, a further feature is that the pivot bearing of the magnetic transmission gear is formed by a fixed axle, which is firmly anchored in a carrier plate.

It is, for example, injected into the carrier plate and stably guided along a longer axial length in a manner that protects it against bending so that the axle is protected against bending and, in the axial direction, injected into the carrier plate in a completely fixed manner.

One advantage is that a snapping mechanism is provided as a pivot bearing between this fixed axle and the magnetic transmission gear, which results in a particularly easy positioning.

This makes the assembly very easy since the magnetic transmission gear is simply placed onto an annular groove of the axle, the diameter of which decreases and is thus held in place there.

In a kinematic reversal, it is also possible, however, that the axle holds an annular ring, the diameter of which increases, which engages at the inner circumference of the bore in the magnetic transmission gear with an assigned annular groove, the diameter of which decreases.

Consequently, it is a simple plug-on, which is normally associated with the disadvantage of some axial play.

This is where the invention, which provides that the axle is made of magnetically conductive material, comes in so that a constant reciprocal pull exists between the permanent magnet embedded at a small distance from the front side of the axle and located below the axle and the magnetically conductive material of the fixed axle.

This ensures that the permanent magnet embedded in the magnetic transmission gear always exerts a tensile force on the axle and therefore pretensions the entire magnetic transmission gear with a certain axial pretension vis-A-vis the snapping mechanism and that it can furthermore come in contact with a fixed housing.

The stop is formed in such a way that a certain front side of the magnetic transmission gear may rub against the stop surface of the fixed housing, but this stop always remains in place and does not have any axial play.

The technical teaching that the magnetic transmission gear is fixed on the magnetically conductive axle due to the magnetic holding force and pretension has the advantage that a distance, which is free from play, which always remains the same, and which is unchangeable, exists between the front side of the permanent magnet and the Hall element below it.

This ensures an always constant application of a constant permanent magnetic force on the Hall sensors without a weakening of the magnetic field or a deviation of the reciprocal distance between the permanent magnets and the magnetically sensitive surface of the Hall element.

The magnetic pull between the transmission gear holding the permanent magnet and the magnetically conductive axle is only claimed, however, in exceptional cases because the exactness of the snapping mechanism is chosen so precisely that an axial displacement between the magnetic transmission gear and the axle onto which the transmission gear is placed cannot occur from the start.

Only in exceptional cases, for example if oscillations or vibrations were to occur, the magnetic tensile force between the upper front side of the permanent magnet and the opposite front side of the magnetically conductive axle may help generate an additional holding force, which is superimposed on the holding force of the snapping mechanism.

Embedding permanent magnets into magnetically neutral plastic material of the magnetic transmission gear is particularly easy and cost effective, and the result cannot be compared with the complex assembly process according to the object of EP 1 391 696 A2 where, in a multi-step fastening process, the permanent magnet must be attached to the corresponding magnetic transmission gear.

As known from prior art, a one-level arrangement is known for multi-turn angle rotary encoders, which means that the conductor plate comprises an optic single-turn scanning function on its one side and a magnetically working multi-turn scanning function on the opposite side.

This results in a particularly compact design.

In special application cases, however, it is preferred that a two-level design is provided instead of the one-level design with a single conductor plate. According to a further feature of the invention, this design is characterized by the fact that a total of two conductor plates are arranged at a distance from each other.

Such a two-level design is preferred especially when the space for the arrangement of the components on the single conductor plate no longer suffices, and it is necessary to use the second conductor plate.

In this case, two printed circuits board are arranged parallel to each other at a reciprocal distance. A relatively large micro-controller or higher components may be arranged on the second conductor plate, which cannot be accommodated on one level and with a single conductor plate.

Such a two-level design is characterized by the fact that, once again in the manner described above, the optic single-turn scanning function is arranged on the one side of the conductor plate arranged in the middle (first level), and the magnetic multi-turn scanning function is arranged on the opposite side in the known manner, but a second conductor plate is arranged in the space above, i.e. beyond the magnetic multi-turn scanning function and above a transmission, which is part of the magnetic multi-turn scanning function.

In this case, the magnetic scanning no longer takes place on the lower conductor plate, but the scanning is moved so that the reduction gear is now facing upward and offers the opportunity that the upward facing permanent magnets of the magnetic transmission gears now make it possible that a further conductor plate is arranged above this transmission, which forms the cover plate of the housing at the same time and on whose underside the Hall sensors are now arranged, which interact with the transmission-side permanent magnets that are embedded in the magnetic transmission gears.

In the aforementioned one-level design, however, it is also possible to arrange a second conductor plate on top of the upper front side of the transmission if there is enough space.

In the two-level version, however, the magnetic scanning and the optical scanning must be separated from each other in the area of a single conductor plate and are now only used for the optic scanning on the one conductor plate, which is arranged in the central region of the multi-turn rotary encoder, and the other, further conductor plate, which delimits the upper side of the housing, is now used for the magnetic scanning of the multi-turn rotary encoder.

This also results in the advantage of a compact design because the upper conductor plate with the Hall sensors below it is located directly opposite the magnetic transmission gears of the transmission.

The invention assumes that a reduction gear with three magnetically driven transmission gears is present, wherein a permanent magnet is embedded in each magnetic transmission gear as described above.

This means that when three magnetic transmission gears arranged in a transmission design are used, a reduction of the angle of a shaft at a ratio of 1:16 to the first magnetic transmission gear, and then based on this gear, a further reduction of 1:16 to the second magnetic transmission gear, and based on that gear, a further reduction of 1:16 to the third magnetic transmission gear takes place.

In total, therefore, the reduction takes place at a ratio of 1:4096.

The invention is naturally not limited to the arrangement of three reduction gears.

Only two transmission gears or more than three may be used instead.

This is while only one exemplary embodiment in which three transmission gears are arranged in a reduction design of a transmission is described in further detail. The invention is not limited to this embodiment, however.

It is important in any event that each magnetic transmission gear has the previously mentioned embedded permanent magnet and that the receiving configuration with an axial pretension is present.

In a further development of the present invention, a suitable evaluation circuit is provided for this purpose as well, wherein the signals from the individual permanent magnets (which are present in triplicate and integrated in the reduction configuration of the transmission) are now evaluated in a particularly advantageous manner.

To this purpose, an evaluation circuit is provided which provides for a first sensor in a first step, into which the respective Hall sensor is embedded, wherein, in a preferred design, a total of four Hall sensor elements are arranged in a specific matrix and embedded in the sensor.

Such a sensor is therefore assigned to each step with a matrix of Hall sensors. For the evaluation circuit, it is important that the output of the first step is directly connected to the input of the second sensor step and that the output of the second sensor step is directly connected to the input of the third sensor step, whose output directly emits the composite single-turn and multi-turn code word in a serial form.

This also allows for a Daisy chain progression of the sensor signals through all sensor steps, which is new and inventive over prior art.

In the prior art, a parallel evaluation of the individual steps is performed in a central module, which must be separately integrated as the evaluation module, while in the present invention, a particularly compact and simple design is provided due to the fact that the evaluation circuits for the matrix-like arranged Hall sensors are arranged in the sensors at the same time.

Consequently, a central evaluation instance is no longer necessary, which saves space on the conductor plate and leads to a further improvement of the compact design.

The signals that are emitted at the output of the respective sensor step and fed into the input of the subsequent sensor step are digital data words, which are serially processed and which are serially transmitted from the one sensor step to the next.

With regard to the single-turn evaluation circuit, it is important that the output of the single-turn evaluation circuit is directly connected to form the input of the first multi-turn evaluation circuit so that the signals of the single-turn evaluation circuit form the input of the first sensor step of the multi-turn evaluation.

It was stated above that a stable, axial safeguard against a displacement of the magnetic transmission gear is provided by the magnetic tensile force that acts on the magnetic axle.

If such a fastening with a magnetic pretension on the axle is not desired, it may be provided in another design in which each Hall sensor is surrounded by a distance-creating spacer ring at its outer circumference, and the permanent magnet, which is embedded in the magnetic transmission gear, is placed directly, without play, on the spacer ring.

This results in a certain degree of friction, however, which is acceptable because the materials are self-lubricating.

Instead of a pretensioned, play-free positioning, which is pretensioned by the magnetic force, a second design therefore provides that the magnetically pretensioned positioning of the magnetic transmission gear is not present and that it is now fully positioned on the respective spacer ring on the side of the conductor plate without a snapping connection as a pivot bearing.

The object of the present invention is not only described in the individual claims but must also be viewed as a combination of the individual claims with each other.

All information and features disclosed in the documentation, including the abstract, and especially the spatial configuration shown in the drawings are claimed as essential to the invention, as far as they are novel over prior art either individually or in combination.

Hereinafter, the invention will be described in further detail on the basis of just one execution path. The drawings and their description provide further features that are essential to the invention and advantages of the invention.

FIGS. 1 to 3 show a multi-turn rotary encoder 1, which essentially consists of an upper reduction gear 2, whose carrier plate 12 is made from plastic material.

In another design, it may also be provided, however, that this carrier plate 12 is made from light metal pressure casting material.

Figure 1:
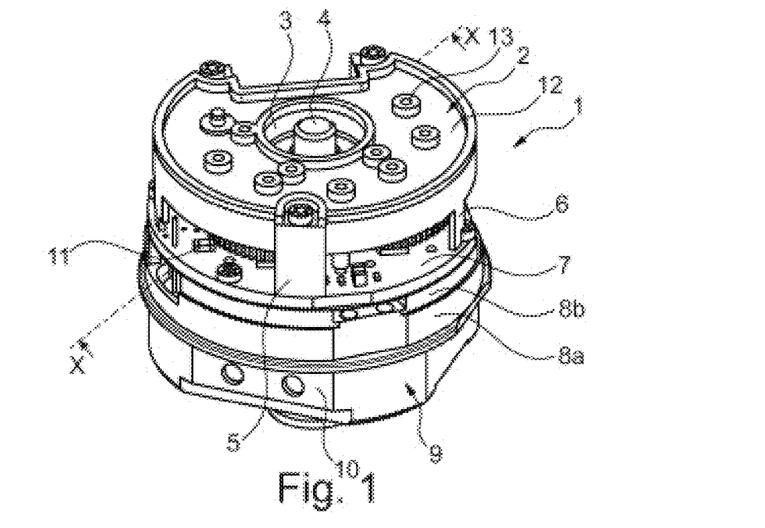
FIG. 1: shows a perspective view of a multi-turn rotary encoder
Figure 2:
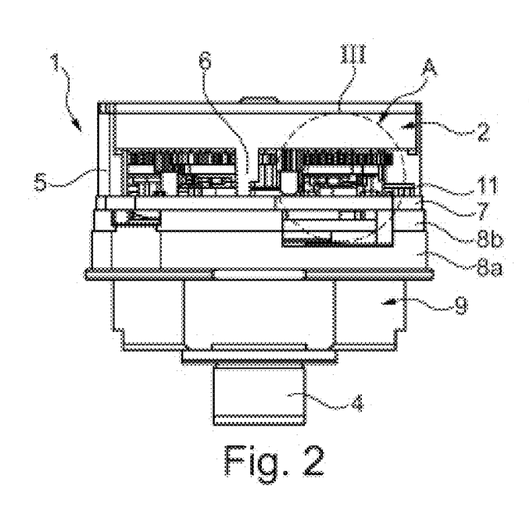
FIG. 2: shows the side view of the rotary encoder according to FIG. 1
Figure 3:
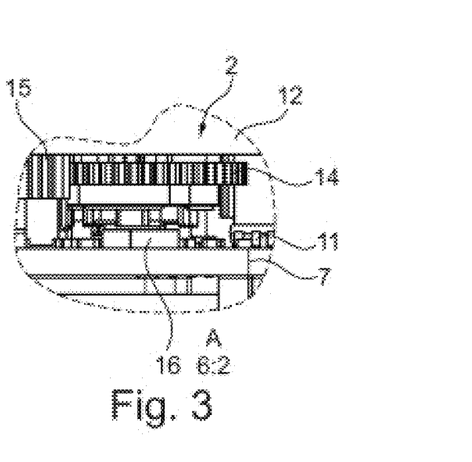
FIG. 3: shows a detailed representation according to detail Ill in FIG. 2

The reduction gear 2 comprises a central recess 3 through which the free end of a shaft 4 protrudes and whose angle of rotation is to be detected by the multi-turn rotary encoder.

The carrier plate 12 braces itself against a conductor plate 7 located below it by means of axial lugs 5 that are evenly distributed around the circumference. Between them, supports 6, which brace themselves against the upper side of the conductor plate 7, are circumferentially formed on the underside of the carrier plate 12.

The housing 9, which is preferably made from metal, has an annular shape and comprises an upward facing annular flange 8a, which continues in a further annular flange 8b.

The conductor plate 7 is fastened to this annular flange 8b.

On the one front side, a fastening plate 10 with hole-shaped receptacles is provided on the housing 9 so that the housing 9 can be mounted to an associated mounting surface.

FIG. 3 shows the detail of the section from FIG. 2. It can be seen that several components 11 are arranged on the conductor plate 7, which extend in the direction of the underside of the transmission 2 located above it.

A plurality of transmission gears 14, 15 is present, which are described in further detail on the basis of the following drawings.

Figure 4:
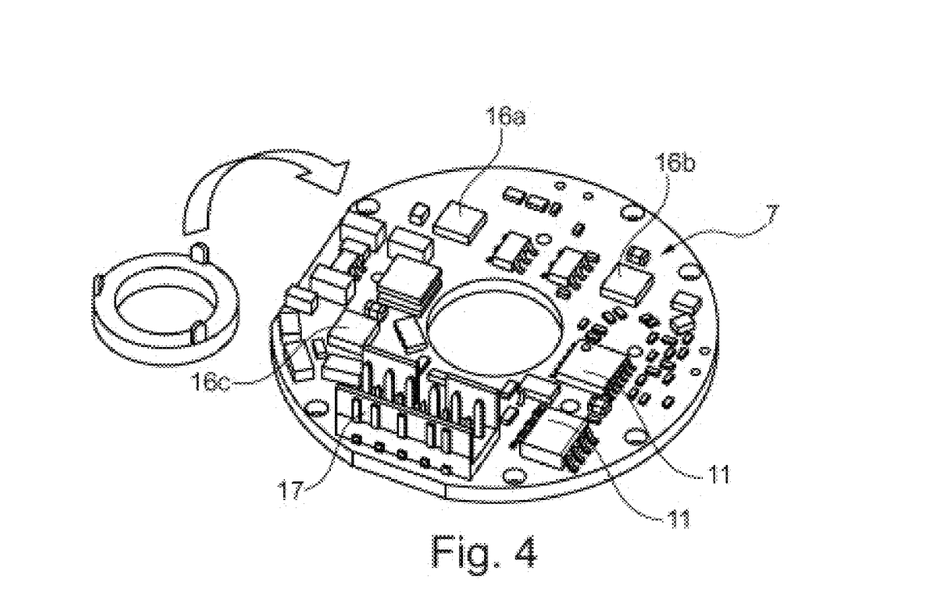
FIG. 4: shows a perspective view of a conductor plate

FIG. 4 shows a perspective view of the conductor plate 7. It can be seen that three Hall sensors 16a, b, and c are offset from each other at a reciprocal distance and combined with the corresponding electronic components, which are all identified with the reference sign 11.

A connector 17 may be arranged on the conductor plate 7 as well.

FIG. 1 also shows that axle receivers 13 are present in the carrier plate 12 for the axles of the transmission, which will be described below, in which the axles are rotatably embedded.

Figure 5:
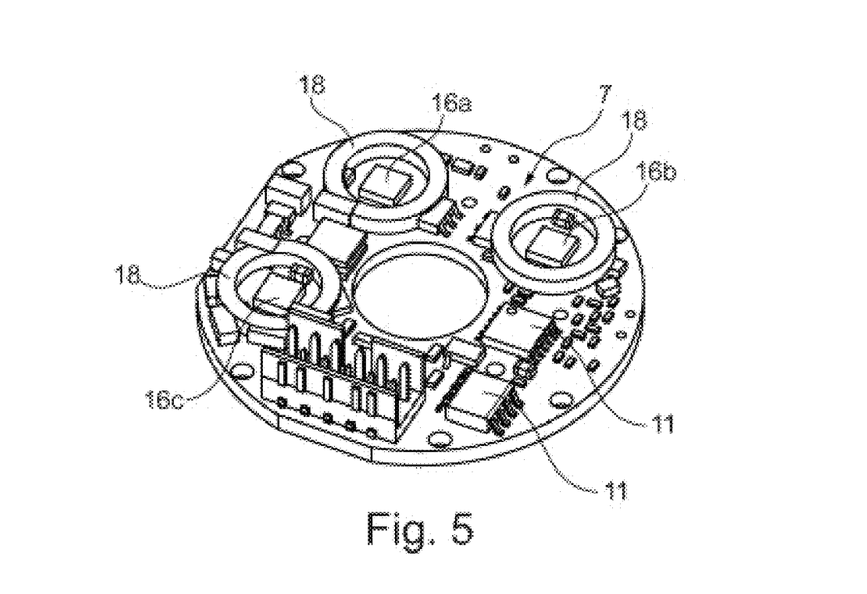
FIG. 5: shows the perspective view of the conductor plate according to FIG. 4 with the optimal placement of spacer rings
Figure 10:
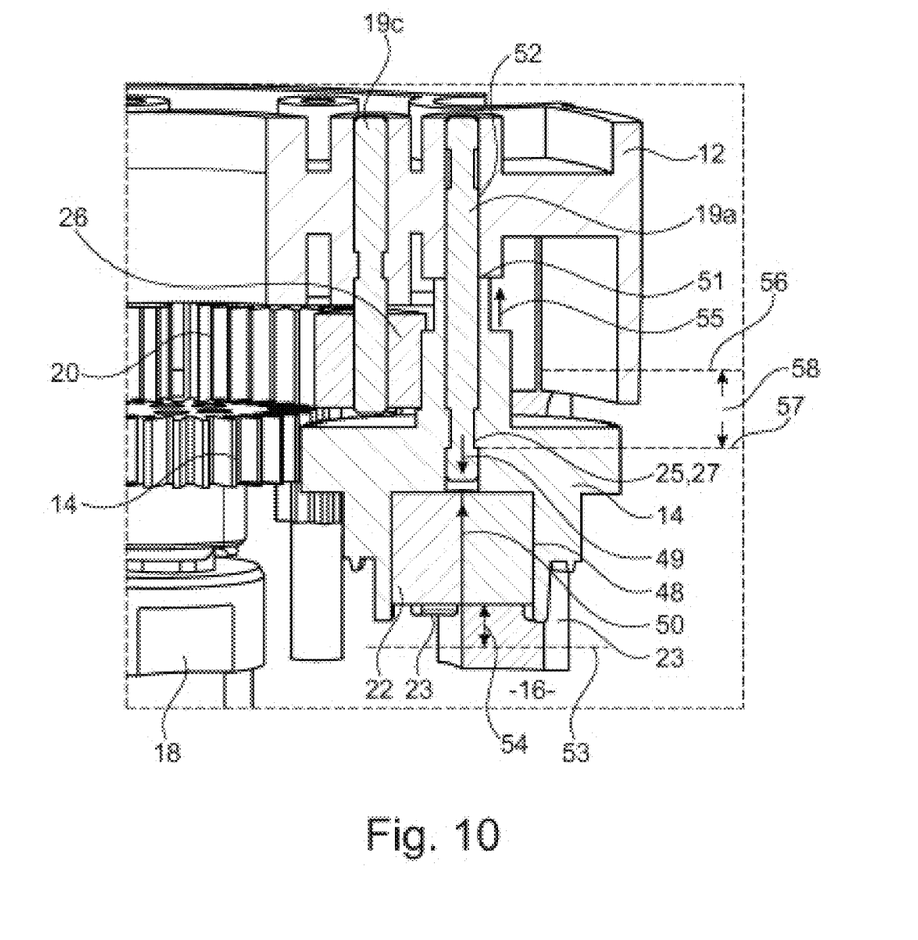
FIG. 10: shows a local section along the intersection line X-X in FIG. 1

FIG. 5 shows an optional embodiment in comparison with FIG. 10, wherein distance-maintaining spacer rings 18 are provided to keep the distance between the permanent magnets 22 that are embedded in the magnetic transmission gears 14 and the surface of the corresponding Hall sensors 16a, 16b, and 16c, which preferably fully surround the respective Hall sensor and are a little higher in their axial extension than the surface of the respective Hall sensor 16 so as to form a precisely defined distance.

The respective permanent magnet 22 is then mounted on the surface of the spacer ring 18.

It will be shown later, cf. FIG. 10, that the spacer rings 18 may be completely left out as well and a precise distance may be established between the respective permanent magnets 22 and the Hall sensor 16 by other measures according to the independent claim 1, and therefore the friction-increasing spacer rings 18 may be foregone.

Figure 6:
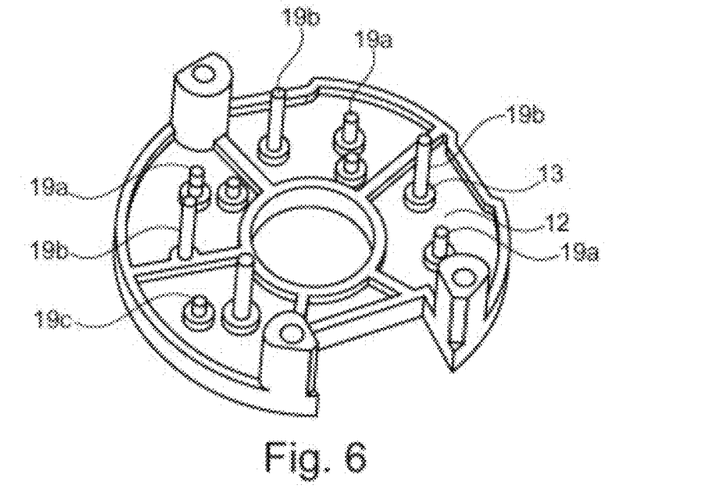
FIG. 6: shows a carrier plate for the reduction transmission

FIG. 6 shows the underside of the carrier plate 12. It can be seen that a specified number of the first type of axles 19a is injected into the assigned axle receivers 13, and they are therefore positioned in a rotatably fixed manner so that they cannot be displaced or buckle.

There are shorter axles 19b as well, which are used to position the intermediate rings of the transmission.

Figure 7:
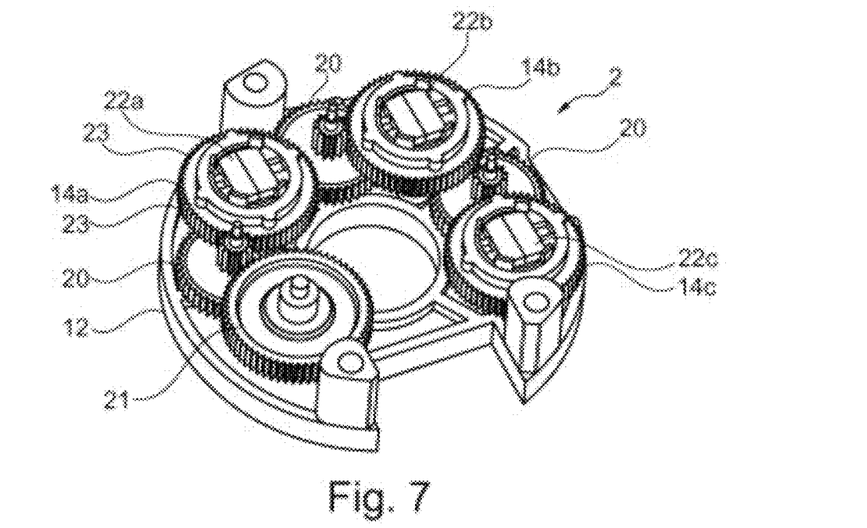
FIG. 7: shows the finished reduction transmission connected to the carrier plate according to FIG. 6
Figure 11:
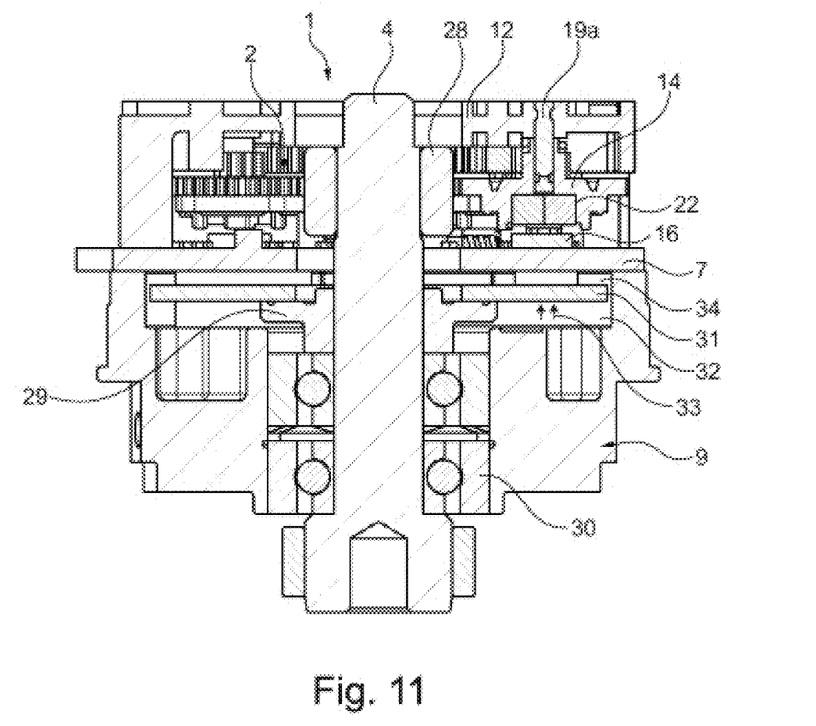
FIG. 11: shows the same local section as FIG. 10 with further details

FIG. 7 shows the transmission design where a drive gear 21 with a drive pinion 28, which is connected to the shaft 4 in a rotatably fixed manner, cogs (cf. FIG. 11).

The drive gear 21 acts like a gear reduction 1:16 on a transmission gear 20, which itself consists of a drive gear and a gear with a greater diameter.

The greater gear in the transmission gear 20 cogs with a smaller drive pinion, which is not shown in further detail, which is connected to the respective transmission gear 14a, 14b, 14c in a rotatably fixed manner.

This way, a lower drive level 56 (cf. FIG. 10) is formed by the transmission gears 20 acting as connecting links. At a distance 58 from it, there is an upper drive level 57, which is formed by the individual magnetic transmission gears 14a, 14b, 14c.

With respect to FIGS. 6 and 7, it should be added that the axles 19b, which are longer in their axial length, are used to mount the transmission gears 20 while the shorter axles 19a are made from a magnetically conductive material and are used to mount the magnetic transmission gears 14.

This way, a 1:4096 reduction is achieved between the drive gear 21 and the last magnetic transmission gear 14c.

Figure 8:
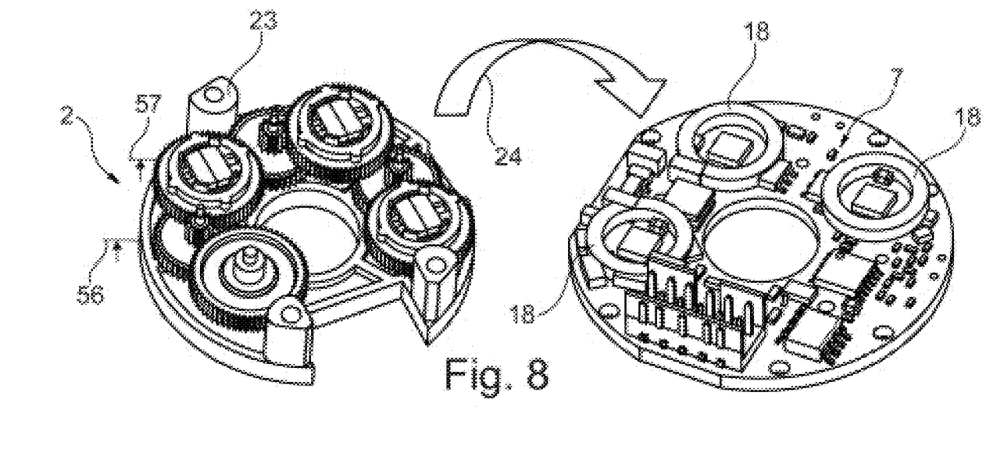
FIG. 8: shows a representation of the assembly of the transmission according to FIGS. 6 and 7 on the conductor plate according to FIG. 5
Figure 9:
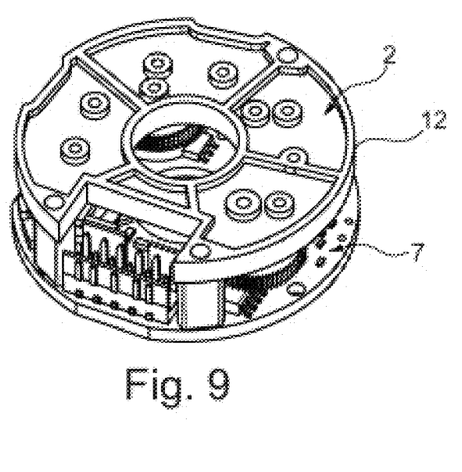
FIG. 9: shows the finished assembly according to FIG. 8

FIGS. 8 and 9 show the particularly easy assembly of the transmission 2 on the conductor plate 7. It can be seen that, in the first embodiment, which works with spacer rings 18, the reduction gear 2 is snapped onto the conductor plate 7 in the direction of the arrow 24. There are retaining lugs 23, which support themselves on the surface of the conductor plate and are screwed together with the same by means of screwing elements that are not shown in further detail. The result is an overall design as shown in FIG. 9.

FIG. 8 also shows the different transmission levels of the gears 14 and 20 in the form of the representation of levels 56 and 57.

FIG. 10 shows the second embodiment where the distance-maintaining spacer rings 18 are not used, but instead, the technical teaching according to the independent claim 1 is used for a precise, play-free mounting of the magnetic transmission gears 14.

FIG. 10 shows an intermediate gear 26, which is mounted in a short axle 19c.

A total of three intermediate gears 26 are present, and the corresponding axle stubs 19c are shown in FIG. 6.

What is important about this embodiment is that the friction-increasing spacer rings 18 are not necessary and a snapping mechanism, which is under a magnetic holding force, is provided.

The axle 19a is mounted in the carrier plate 12 in the overmold 52 in a rotatably fixed and displacement-protected manner and guided along a longer axial length so that it is mounted without any play.

The front free end of the axle 19a is provided with an annular groove, the diameter of which decreases, which engages with a ring set 27 with an increasing diameter in the inner bore of the transmission gear 14.

The transmission gear is therefore placed on the free axle stub so that the annular groove 25 positively engages with the ring set 27 of the transmission 14, thus providing a pivot bearing.

Since such a pivot bearing is always, however, associated with a certain degree of axial play, an axial magnetic pretension is provided.

To this purpose, the permanent magnet 22 embedded in the material of the transmission gear in the area of an overmold 48 now exerts a magnetic force on the axle 19a consisting of magnetic material with its embedding front side in the direction of the arrow 50 so that a tensile force is created that acts in the direction of the arrow 49.

This way, the transmission gear 14 is pulled upward in the direction of the arrow 55 against the axle 19a and, with a respective annual projection arranged on the front side, comes in contact with a respective stop surface in the carrier plate 12.

This results in a play-free, axial displacement safeguard, which, even if the entire assembly has a longer service life, always leads to a constant and unchangeable distance 54 from the Hall sensor 16 below.

In the drawing shown in FIG. 10, the magnetically sensitive surface is only drawn in as a reference line 53 of a Hall sensor 16 that is not realistically shown.

FIG. 11 shows the so-called one-level design of the multi-turn rotary encoder 1 according to the invention. It shows that a drive pinion 28 is connected with the shaft 4 in a rotatably fixed manner, which engages with the drive gear 21 of the transmission 2.

It can also be seen that a disk flange 29 is connected with the shaft 4 in a rotatably fixed manner on which an optically acting code carrier 31 is mounted.

A lighting unit 32 is arranged below the code carrier 31. It directs a beam of light in the direction of the arrow 33 against the underside of the code carrier 31, which is penetrated by this beam of light and which receives the corresponding measurement signal from an optically sensitive single-turn scanner 34.

The single-turn scanner 34 is therefore arranged on the underside of the conductor plate 7 while the corresponding Hall sensors 16a, 16b, 16c are arranged on the upper side of the conductor plate.

The shaft 4 furthermore has a ball bearing 30. Consequently, it is a one-level design because the conductor plate 7 is the only conductor plate used.

Figure 12:
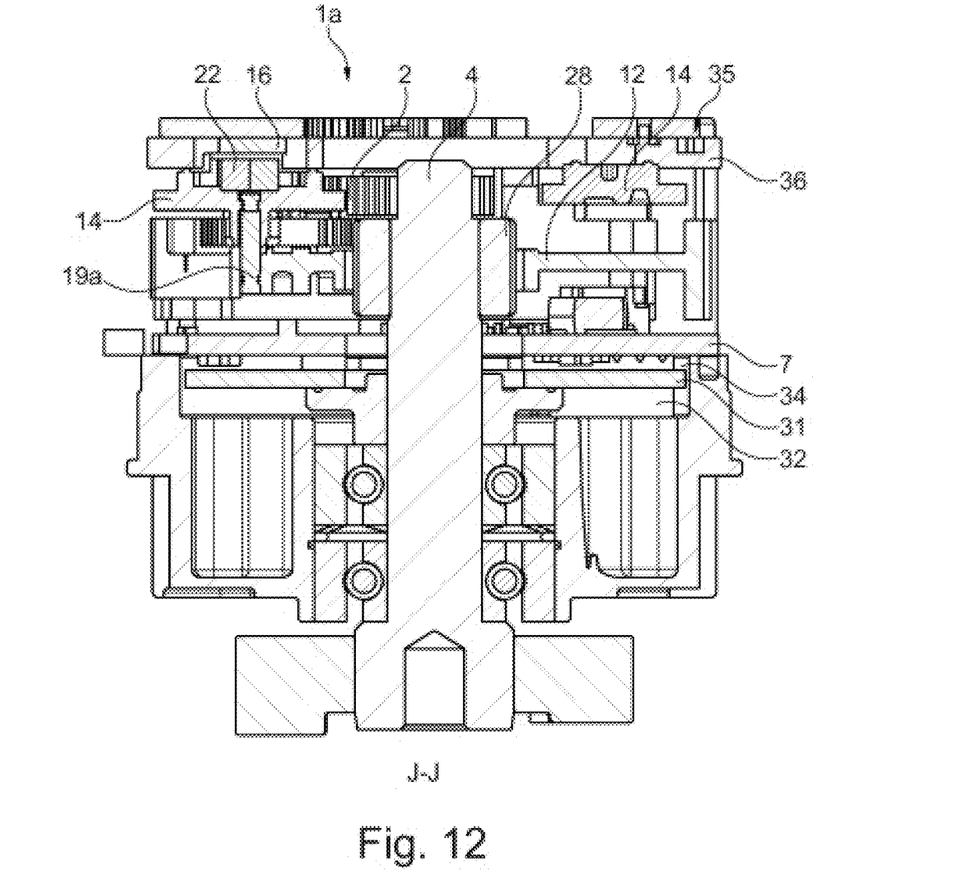
FIG. 12: shows an embodiment that has been modified from the one in FIG. 11 with a two-level design of the rotary encoder

In contrast, FIG. 12 shows a multi-turn rotary encoder 1a, which has a two-level design, characterized in that the conductor plate 7 with the components 11 mounted on it is present and that only one single-turn scanning function is present on the underside of the conductor plate, as shown in FIG. 11, while the magnetic scanning has now been moved to the upper side of the transmission 2.

The same parts are identified with the same reference signs. It can be seen that the reduction gear was basically turned by 180 degrees and the permanent magnets 22, which had previously pointed downward, now point upward in the direction of the underside of a further conductor plate 35 forming a cover plate, at the underside of which the Hall sensors 16*a*, 16*b*, 16*c* are arranged.

By arranging two conductor plates 7, 35 opposite each other, a compact design can be achieved as well, and the second conductor plate 35 provides the opportunity to arrange further space-occupying components in the space created in the direction of the reduction gear, which was not possible in the first-referenced embodiment according to FIG. 11.

It may also be provided that the first conductor plate 7 is connected with the second conductor plate 35 via flexible conductor paths, which are not shown in the representation according to FIG. 12.

An intermediate plate 36 may furthermore be provided between the underside of the conductor plate 35 and the upper side of the transmission, which adjusts the defined distance between the conductor plate 35 and the permanent magnets 22 of the transmission 2.

Consequently, the intermediate plate 36 may take over the function of the distance-maintaining rings 18.

Naturally, this embodiment also provides, within the meaning of the description of FIG. 10, that a magnetically pretensioned snapping mechanism is present between the respective axles 19*a* and the corresponding permanent magnets 22.

In this case, the intermediate plate 36 is not necessary.

Figure 13:
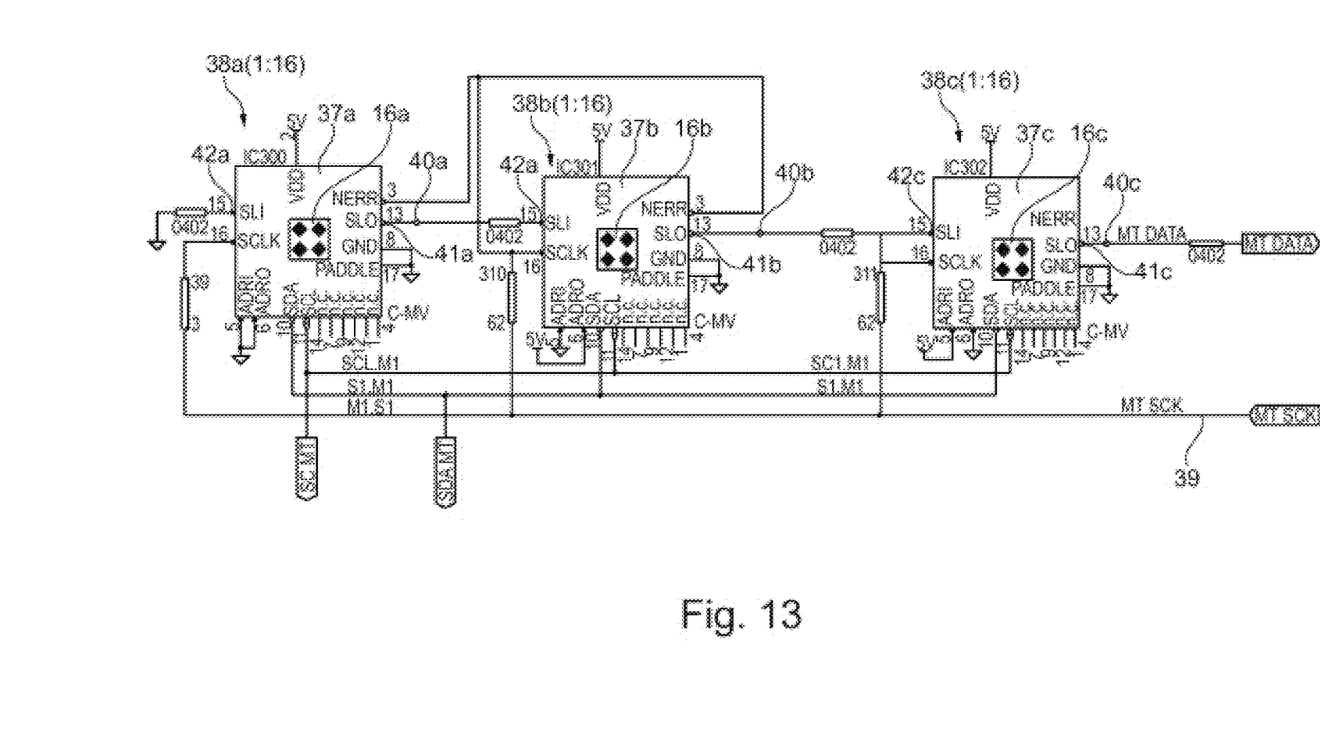
FIG. 13: shows a functional diagram of an electric evaluation circuit for the multi-turn rotary encoder

FIG. 13 shows a preferred embodiment of an evaluation circuit. What is important here is that each magnetic transmission gear and the permanent magnet 22 embedded in it is associated with a sensor 37*a*, 37*b*, 37*c*.

The sensor consists of a matrix of Hall sensors 16*a*, 16*b*, 16*c* with each Hall sensor essentially consisting of four Hall sensors arranged at a distance from each other.

It is also possible to provide a single Hall sensor instead of a matrix of a plurality of Hall sensors.

What is important about the evaluation circuit according to FIG. 13 is that initially a clock signal is fed in parallel to all sensors 37 via the clock line 39, and the data input 42*a* at the first sensor is grounded, and now the first reduction stage for the first transmission gear 14*a* is provided in the first sensor.

The sensors 37*a*, *b*, *c* are therefore arranged in cascading steps 38*a*, 38*b*, 38*c*, and the respective output signal at the data output 41*a* of the first sensor 37*a* is transmitted to the first data input 42*b* of the second step 38*b* according to the invention.

The data output 41*b* in the second step 38*b* is transmitted via the data output line 40*b* to the input 42*c* of the third step 38*c*, and its data output 41*c* forms a combined data word, which consists of the single-turn data word and the multi-turn data word.

All data words are arranged serially and nested in each other.

Figure 14:
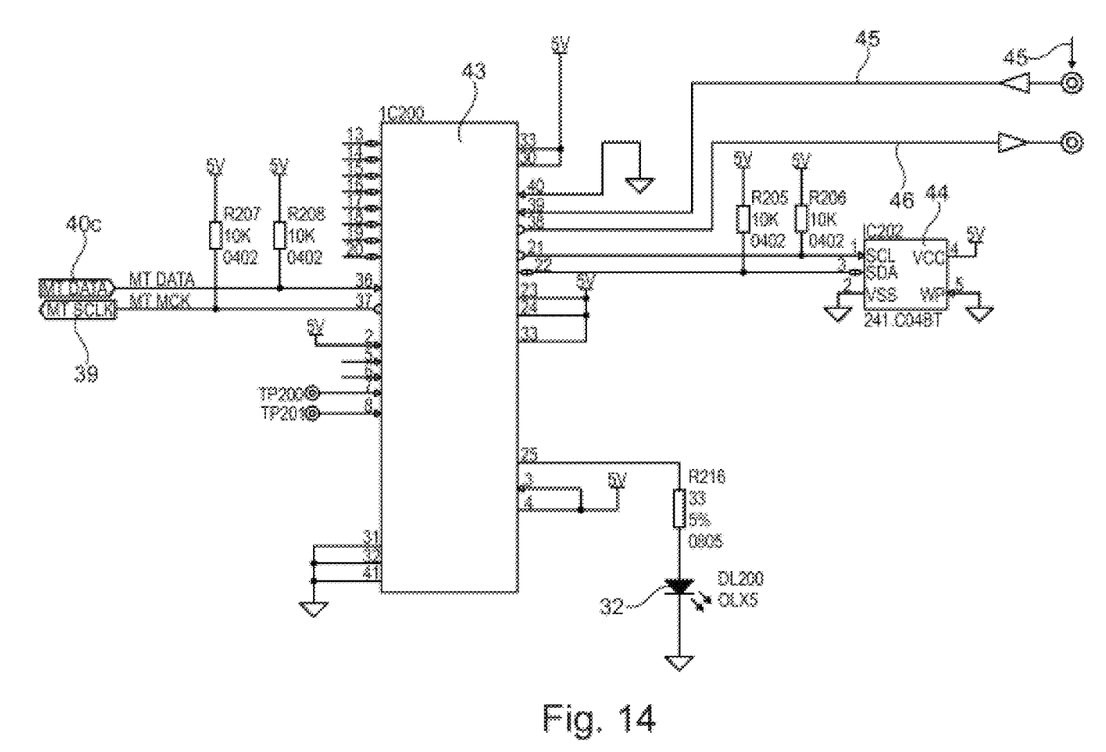
FIG. 14: shows a functional diagram for the single-turn evaluation

The multi-turn code word thus created in the data output line 40*c* is transmitted in a serial form to the single-turn signal processing 43 in FIG. 14.

The module shown there forms the single-turn position word and forms, together with the multi-turn position, an overall position word at the data output 46, which consists of the single-turn value and the multi-turn value.

A superordinate master, which is not shown in any drawing, requests, via the clock line 45, the issuance of the combined data word from the signal processing 43 on the data output 46.

A memory 44 is present as well, with which the signal processing 43 can be configured.

Overall, the Daisy chain data processing offers the advantage that in the evaluation circuit according to FIGS. 13 and 14, in the region of the sensors 37*a*, *b*, *c*, the digital evaluations take place at the same time. This means that external separate components that require extra work and space are not necessary.

The programming effort is minimized as well because the individual sensors can be programmed with the digital means.

EXPLANATION OF THE DRAWINGS

1, 1*a* Multi-turn rotary encoder
2 Reduction gear
3 Recess
4 Shaft
5 Lug
6 Support
7 Conductor plate
8 Annular flange a, b
9 Housing
10 Fastening plate
11 Components (from 7)
12 Carrier plate
13 Axle receiver
14 Magnetic transmission gear
15 Gear
16 Hall sensor a, b, c
17 Connector
18 Spacer ring
19 Axle a, b
20 Transmission gear
21 Drive gear
22 Permanent magnet
23 Retaining lug
24 Direction of the arrow
25 Annular groove
26 Intermediate gear
27 Ring set
28 Drive pinion (from 4)
29 Disk flange
30 Ball bearing
31 Optic code carrier
32 Lighting unit
33 Direction of the arrow
34 Single-turn scanning
35 Conductor plate (second plate)
36 Intermediate plate
37 Sensor a, b, c
38 Step a, b, c
39 Clock line
40 Data output line a, b, c
41 Data output a, b, c
42 Data input a, b, c
43 Signal processing
44 Memory
45 Clock line (field bus)
46 Data output (multi-value)
47
48 Overmolding (from 22)
49 Direction of the arrow
50 Direction of the arrow
51 Stop surface
52 Overmolding
53 Reference line (16)
54 Distance
55 Direction of the arrow 56 Lower drive level (from 2)
57 Upper drive level
58 Distance

The invention claimed is:

1. Multi-turn angle measurement device for measuring multiple revolutions of a shaft (4), consisting of a first code carrier (31) with an optic single-turn scanning function (34) for detecting the absolute position of the shaft and a second code carrier for measuring the number of revolutions of the shaft (4) wherein a reduction gear (2) is arranged between the first code carrier (31) and the second code carrier, and the second code carrier consists of a plurality of permanent magnets (22), the position of which is detected by an assembly of Hall sensors (16a-16c) fixed to the housing, characterized in that each of the permanent magnets (22) is embedded in the plastic material of the transmission gears (20) of the reduction gear (2) and that the respective transmission gear (20) is held on its corresponding axle (19a-b) with a snapping mechanism, wherein a magnetic force exists between the magnetic axle (19a-19b) and the permanent magnet (22).

2. Multi-turn angle measurement device according to claim 1, characterized in that the magnetization of the permanent magnets (22) occurs after they are embedded in the plastic material of the transmission gear (20) in the injection mold.

3. Multi-turn angle measurement device according to claim 1, characterized in that a magnetic force is an axial pretensioning force.

4. Multi-turn angle measurement device according to claim 1, characterized in that only a single conductor plate (7) is present on whose underside the single-turn scanning function (34) and on whose upper side the magnetic multi-turn scanning function are arranged.

5. Multi-turn angle measurement device according to claim 1, characterized in that a two-level design with two conductor plates (7, 35), which are arranged at a reciprocal axial distance, is present.

6. Multi-turn angle measurement device according to claim 5, characterized in that the second conductor plate (35) is arranged above the transmission (2) and the first conductor plate below the transmission (2).

7. Multi-turn angle measurement device according to claim 5, characterized in that the magnetic scanning function is arranged on the second conductor plate (35).

8. Multi-turn angle measurement device according to claim 1, characterized in that an evaluation circuit is provided, which, in a first step, provides a first sensor (37) in which the respective Hall sensor (16) is embedded, and a number of Hall sensors (16) are embedded and thus form a matrix in the sensor (37).

9. Evaluation circuit for a multi-turn angle measurement device according to claim 1, characterized in that the staggered evaluation circuits assigned to the sensors (37) are serially connected in the form of a Daisy chain circuit.

* * * * *